(12) United States Patent
Delst et al.

(10) Patent No.: US 9,796,856 B2
(45) Date of Patent: Oct. 24, 2017

(54) COLORANT INCLUDING A MIXTURE OF PIGMENTS

(71) Applicant: Viavi Solutions Inc., Milpitas, CA (US)

(72) Inventors: Cornelis Jan Delst, Fairfax, CA (US); Vladimir P. Raksha, Santa Rosa, CA (US); David de la Fuente, Rohnert Park, CA (US)

(73) Assignee: Viavi Solutions Inc., Milpitas, CA (US)

( * ) Notice: Subject to any disclaimer, the term of this patent is extended or adjusted under 35 U.S.C. 154(b) by 299 days.

(21) Appl. No.: 14/043,497

(22) Filed: Oct. 1, 2013

(65) Prior Publication Data

US 2014/0090579 A1    Apr. 3, 2014

Related U.S. Application Data

(60) Provisional application No. 61/708,479, filed on Oct. 1, 2012.

(51) Int. Cl.
*C09C 3/04* (2006.01)
*C09C 1/22* (2006.01)
*C09C 1/00* (2006.01)

(52) U.S. Cl.
CPC .............. *C09C 3/04* (2013.01); *C09C 1/0015* (2013.01); *C09C 1/0078* (2013.01); *C09C 1/0081* (2013.01); *C01P 2006/65* (2013.01); *C01P 2006/66* (2013.01)

(58) Field of Classification Search
CPC .... C09C 1/00; C09C 1/62; C09C 1/22; C09C 3/04
See application file for complete search history.

(56) References Cited

U.S. PATENT DOCUMENTS

| 2,177,251 | A | 10/1939 | Hanahan et al. ............. 106/424 |
| 2,225,303 | A | 12/1940 | Iliff et al. ...................... 525/315 |
| 5,221,342 | A | 6/1993 | Minami et al. ............... 106/461 |
| 5,569,535 | A | 10/1996 | Phillips et al. ............... 428/403 |
| 5,570,847 | A | 11/1996 | Phillips et al. .................. 241/23 |
| 5,618,342 | A | 4/1997 | Herget et al. ................. 106/416 |
| 5,766,738 | A | 6/1998 | Phillips et al. ............... 428/200 |
| 6,150,022 | A * | 11/2000 | Coulter ................. C09C 1/0015 106/499 |
| 6,157,489 | A | 12/2000 | Bradley, Jr. et al. ......... 359/584 |
| 6,243,204 | B1 | 6/2001 | Bradley, Jr. et al. ......... 359/585 |

(Continued)

FOREIGN PATENT DOCUMENTS

| CN | 101297003 A | 10/2008 | |
| EP | 0786676 | 7/1997 | ............... G02B 5/28 |

(Continued)

OTHER PUBLICATIONS

PCT Search Report for PCT/US13/62919 dated Jan. 31, 2014.

(Continued)

*Primary Examiner* — Pegah Parvini
(74) *Attorney, Agent, or Firm* — Harrity & Harrity, LLP

(57) ABSTRACT

A colorant including a mixture of pigments is disclosed. The pigments have a similar coloration but different resistance to corrosion. The mixing ratio is selected to optimize the corrosion resistance against color brightness, and/or acidic corrosion resistance against alkali corrosion resistance of the colorant.

20 Claims, 4 Drawing Sheets

(56) References Cited

U.S. PATENT DOCUMENTS

| | | |
|---|---|---|
| 6,246,523 B1 | 6/2001 | Bradley, Jr. et al. ......... 359/585 |
| 6,383,638 B1 | 5/2002 | Coulter et al. ................ 428/403 |
| 6,569,529 B1 | 5/2003 | Phillips et al. |
| 6,777,085 B1* | 8/2004 | Argoitia ................ C09C 1/0015 428/328 |
| 7,381,758 B2 | 6/2008 | Vuarnoz et al. .............. 523/160 |
| 7,419,538 B2 | 9/2008 | Li et al. ......................... 106/403 |
| 7,547,211 B2 | 6/2009 | Swanick ........................ 434/84 |
| 2002/0104456 A1 | 8/2002 | Detzner ........................ 101/483 |
| 2002/0160194 A1 | 10/2002 | Phillips et al. ............... 428/403 |
| 2004/0160672 A1 | 8/2004 | Phillips ........................ 359/588 |
| 2004/0223929 A1 | 11/2004 | Clapp et al. .................... 424/63 |
| 2006/0032404 A1 | 2/2006 | Kniess .......................... 106/481 |
| 2008/0207772 A1* | 8/2008 | Kniess .................... A61K 8/19 514/769 |
| 2008/0314284 A1 | 12/2008 | Li et al. ......................... 106/31.9 |
| 2009/0225398 A1 | 9/2009 | Duthaler et al. .............. 359/296 |
| 2012/0214134 A1 | 8/2012 | Khan et al. ................. 433/201.1 |
| 2013/0119298 A1* | 5/2013 | Raksha .................... H01F 1/01 252/62.55 |

FOREIGN PATENT DOCUMENTS

| | | | |
|---|---|---|---|
| EP | 1141143 | 6/2000 | ............... C09C 1/00 |
| WO | 2004/061012 | 7/2004 | |
| WO | 2007000233 A1 | 4/2007 | |

OTHER PUBLICATIONS

Examination Report in corresponding Chinese Patent Application No. 2013800512427 issued on Apr. 12, 2016.

European Search Report in corresponding European Patent Application No. 13843092.1 issued on Apr. 14, 2016.

* cited by examiner

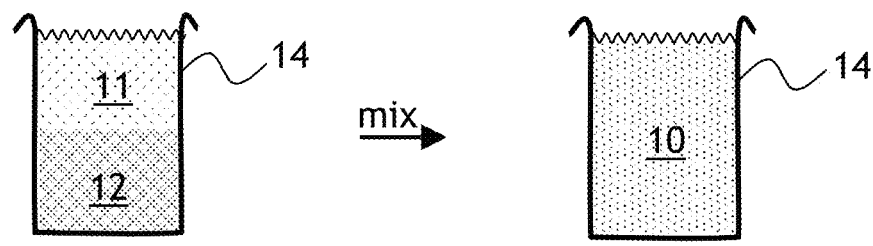
*FIG. 1A*  *FIG. 1B*
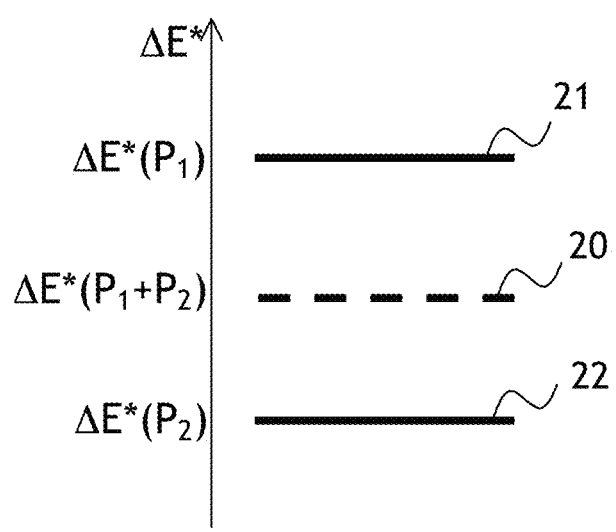
*FIG. 2*

COLORANT INCLUDING A MIXTURE OF PIGMENTS

CROSS-REFERENCE TO RELATED APPLICATIONS

The present invention claims priority from U.S. Patent Application No. 61/708,479 filed Oct. 1, 2012, which is incorporated herein by reference.

TECHNICAL FIELD

The present invention relates to colorants, and in particular to improving corrosion resistance of colorants.

BACKGROUND OF THE INVENTION

Blending of pigments has a long history. 32,000 years ago prehistoric artists used blends of ground red or yellow ochre with clays, charcoal, juice of berries and fat for making paintings on cave walls and ceilings. Currently, blending of various pigments takes place in many industries and in fine arts. Main purpose of blending of pigments is mixing of pigments with different colors to get another, composite color. The blending is brought to a level of high sophistication, with a considerable control of the color properties of the final products.

For industrial applications, as well as in fine arts, permanence and stability of inorganic, organic, or special pigments and their blends are highly desirable. Such attributes as heat stability, toxicity, tinting strength, staining, dispersion, opacity or transparency, resistance to alkaline or acid, interaction between pigments as well as lightfastness (resistance to discoloration caused by light exposure), determine their suitability for particular manufacturing processes and applications. Chemical or electrochemical degradation of pigments typically cause economical losses.

Various methods have been used in the industry to strengthen the corrosion resistance of pigments, including deposition of protective coatings on the top of pigment particles, and/or addition of passivators and corrosion inhibitors to the ink or paint vehicle. For example, Li et al. in US Patent Application Publication 2008/0314284 disclose highly anti-corrosive thin platelet-like metal pigments, in which the surface of thin platelet-like metal substrates are treated with phosphoric acid compounds and/or boric acid compounds, and are further coated with a layer containing hydrated tin oxide to improve the corrosion resistance. Detrimentally, the passivated pigments of Li et al. are more costly than their non-passivated counterparts, due to additional labor and materials costs.

Goniochromatic optical interference pigments, also termed as color-shifting interference pigments, provide bright, vivid colors due to their multilayered interference structure. Optical interference pigments containing a metallic reflector layer and one or more semi-transparent absorber layers are most color-effective among all known high performance pigments. However, these pigments are highly sensitive to the exposure of corrosive media.

Protective coatings can be applied to color-shifting interference pigments. For example, Phillips in US Patent Application Publication 2004/0160672 disclose color-shifting multilayer interference pigments with the outer layers of silicone dioxide that function as a protective layer for the core optical structure $C/SiO_2/C$. In a paint or ink composition that may be subjected to abrasion in a delivery system, the $SiO_2$ outer layers are known to prevent abrasion to the core optical structure that gives rise to color. Thus, in this instance, the color in the paint or ink composition is more durable. Vuarnoz et al. in U.S. Pat. No. 7,381,758 disclose a passivated optically variable pigment, and suitable passivating compounds for this pigment, including anionic tensides.

Corrosion resistance of goniochromatic interference pigments can also be improved by heat treatment of pigment particles. For example, Phillips et al. in U.S. Pat. No. 5,569,535 disclose a collection of color-shifting interference thin film platelets of high chroma. In order to impart additional durability to the interference platelets, the latter can be annealed or heat treated at a temperature ranging from 200° C.-300° C., and preferably from 250° C.-275° C., for a period of time ranging from 10 minutes to 24 hours, and preferably a time of approximately 15-30 minutes.

Phillips et al. in U.S. Pat. No. 5,570,847 and US Patent Application Publication 2002/0160194; and Bradley et al. in U.S. Pat. Nos. 6,157,489; 6,243,204; and 6,246,523 disclose a method of heat-treating multilayer interference platelets to improve durability of the platelets, including subjecting the platelets at a temperature of 200°-300° C. for 10 minutes to 24 hours. The platelets are formed from a multilayer color-shifting interference thin film construction comprising a metal reflecting layer having a multilayer interference thin film structure on both sides of the metal reflecting layer. The multilayer interference thin film structure includes a pair of layers consisting of a dielectric layer and a semi-opaque metal layer with the dielectric layer of the pair being directly adjacent to the metal reflecting layer. However, the pigments of Phillips et al. and Bradley et al. require the extra step of heat treatment at elevated temperatures.

SUMMARY OF THE INVENTION

Corrosion resistance of many pigments decreases with an increase of color brightness. In other words, pigments of a vivid luminous color are frequently prone to corrosion-induced degradation more than pigments of a same, but somewhat more dull color. The inventors have discovered that by mixing together two pigments of similar color but a slightly different chroma or lightness of the color, a colorant can be obtained that has sufficiently vivid colors, and at the same time is sufficiently resistant to corrosion.

For instance, a color-shifting interference pigment including an aluminum reflector produces more vivid colors than a color-shifting interference pigment of a similar color, but based on a chromium reflector, because aluminum is more reflective than chromium. However, aluminum is known to degrade relatively quickly in alkaline solutions, whereas chromium is more stable in such solutions; and chromium degrades in an acidic environment while aluminum is stable in the acidic environment. Therefore, by mixing together aluminum-based and chromium-based interference pigments of a same or similar color, a sufficiently stable and bright colorant may be obtained that is more corrosion resistant than aluminum in alkaline solutions and chromium in acidic solutions.

Many pigments fall into one of two categories. Pigments of a first category show good resistance to acidic environments, but are prone to degradation in alkaline environments. Pigments of a second category are resistant to alkaline environments, but degrade in acidic environments. The inventors have discovered that blending two pigments belonging to these different categories, but exhibiting similar or even exactly the same color, can result in increasing an overall chemical durability of the blend in both acidic and alkaline solutions, as compared to the most sensitive individual pigments of the blend. This finding is particularly valuable for optical interference pigments, because their color characteristics can be generally decoupled from the material system used. As a result, mixing two pigments of a substantially same hue or chroma, but different material systems falling into different corrosion resistivity categories can result in a pigment generally durable in multiple corrosive environments. Thus, mixing pigments of a substantially same color, while appearing unnecessary in view of prior-art mixing of pigments of different colors to obtain new colors, provides significant advantages for improving corrosion resistance.

In accordance with the invention, there is provided a colorant comprising a mixture of first pigment $P_1$ and second pigment $P_2$ having chroma $C^*_1$ and $C^*_2$, respectively, wherein each of $C^*_1$ and $C^*_2$ is at least 10 units in CIE 1976 L*a*b* color space—hereinafter referred to as the L*a*b* color space—under illumination by a D65 standard light source using the 10 degree observer function, wherein a color difference Δhue between the first and second pigments is no more than 30 hue degrees;

wherein the first pigment undergoes a corrosion-induced color change $\Delta E^*(P_1)$ when immersed into a corrosive solution, and wherein the second pigment undergoes a corrosion-induced color change $\Delta E^*(P_2)$ when immersed into the corrosive solution, wherein $\Delta E^*(P_2)<\Delta E^*(P_1)$.

whereby a corrosion-induced color change $\Delta E^*(P_1+P_2)$ of the colorant upon immersion into the corrosive solution satisfies the condition $\Delta E^*(P_1+P_2)<\Delta E^*(P_1)$, wherein the corrosive solution is selected from the group consisting of 2% by weight aqueous solution of $H_2SO_4$, 2% by weight aqueous solution of NaOH, 1.2% by weight aqueous solution of sodium hypochlorite bleach, and water.

In accordance with a preferred embodiment of the invention, when the first pigment corrodes more in basic solutions than in acidic solutions, that is, $\Delta E^*_B(P_1)>\Delta E^*_A(P_1)$; the second pigment corrodes more in acidic solutions than in basic solutions, that is, $\Delta E^*_A(P_2)>\Delta E^*_B(P_2)$; and the second pigment corrodes more in acid that the first, that is, $\Delta E^*_A(P_2)>\Delta E^*_A(P_1)$, the mixture of the first and second pigments can be more stable in acidic solutions than the second pigment alone, that is, $\Delta E^*_A(P_1+P_2)<\Delta E^*_A(P_2)$; while being more stable in basic (alkali) solutions than the first pigment alone, that is, $\Delta E^*_B(P_1+P_2)<\Delta E^*_B(P_1)$. This allows one to mix two pigments of a similar or even exactly the same color, while meeting the specifications for both the acidic and alkali resistance simultaneously; and, of course, meeting the specification for the targeted color.

In accordance with the invention, there is further provided a method of manufacture of a colorant, the method comprising:

(a) providing a first pigment $P_1$ and second pigment $P_2$ each having chroma $C^*_1$ and $C^*_2$, respectively, wherein each of $C^*_1$ and $C^*_2$ is at least 10 units in L*a*b* color space under illumination by a D65 standard light source using the 10 degree observer function, wherein a color difference between the first and second pigments is no more than 30 hue degrees in the polar projection of the L*a*b* color space, wherein the first pigment undergoes a corrosion-induced color change $\Delta E^*(P_1)$ upon immersion into a corrosive solution, and wherein the second pigment undergoes a corrosion-induced color change $\Delta E^*(P_2)$ upon immersion into the corrosive solution, wherein $\Delta E^*(P_2)<\Delta E^*(P_1)$; and (b) mixing together the first and second pigments to obtain the colorant having a corrosion-induced color change $\Delta E^*(P_1+P_2)$ upon immersion into the corrosive solution satisfying the condition $\Delta E^*(P_1+P_2)<\Delta E^*(P_1)$, wherein the corrosive solution is selected from the group consisting of 2% by weight aqueous solution of $H_2SO_4$, 2% by weight aqueous solution of NaOH, 1.2% by weight aqueous solution of sodium hypochlorite bleach, and water. These percentages are of course exemplary and are introduced for clarity. Other concentrations can be used to the same effect.

In one embodiment, in step (a), the corrosion-induced color changes of the first and second pigments and the colorant comprise base-induced color changes $\Delta E^*_B(P_1)$, $\Delta E^*_B(P_2)$, and $\Delta E^*_B(P_1+P_2)$, respectively, upon immersion into the 2% by weight aqueous solution of NaOH.

Furthermore, in one embodiment, in step (a), the first pigment undergoes an acid-induced color change $\Delta E^*_A(P_1)$ upon immersion into the 2% by weight aqueous solution of $H_2SO_4$, wherein $\Delta E^*_A(P_1)<\Delta E^*_B(P_1)$; and the second pigment undergoes an acid-induced color change $\Delta E^*_A(P_2)$ upon immersion into the 2% by weight aqueous solution of $H_2SO_4$, wherein $\Delta E^*_A(P_2)>\Delta E^*_B(P_2)$. When $\Delta E^*_A(P_2)>\Delta E^*_A(P_1)$, an acid-induced color change $\Delta E^*_A(P_1+P_2)$ of the colorant upon immersion into the 2% by weight aqueous solution of $H_2SO_4$ satisfies the condition $\Delta E^*_A(P_1+P_2)<\Delta E^*_A(P_2)$.

Three or more pigments can be mixed to make a corrosion-resistant colorant. The conditions disclosed herein for two-component blends also apply to the case of three-component blends and multi-component blends. For three-component compositions, each component proportion in the colorant is preferably at least 25% by weight.

BRIEF DESCRIPTION OF THE DRAWINGS

Exemplary embodiments will now be described in conjunction with the drawings, in which:

FIGS. 1A and 1B are diagrams of a colorant (FIG. 1B) obtained by mixing two different pigments (FIG. 1A);

FIG. 2 is a diagram of a corrosion-induced color change of the two pigments of FIG. 1A and the colorant of FIG. 1B;

DETAILED DESCRIPTION OF THE INVENTION

Figure 3:
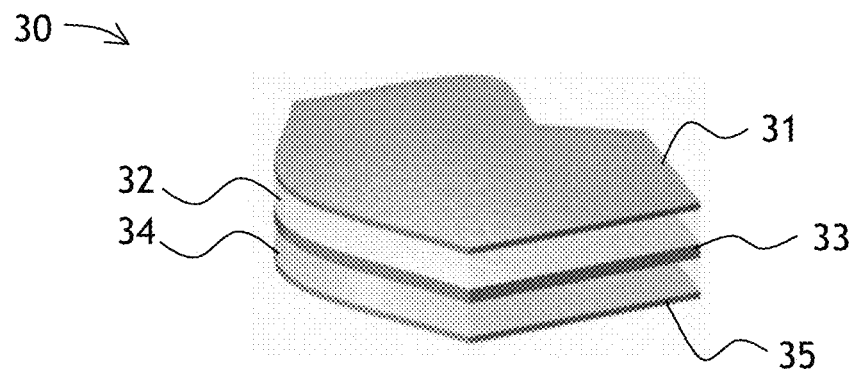
FIG. 3 is a three-dimensional view of a color-shifting interference pigment chip of one embodiment of the first pigment of FIG. 1A.

While the present teachings are described in conjunction with various embodiments and examples, it is not intended that the present teachings be limited to such embodiments.

On the contrary, the present teachings encompass various alternatives and equivalents, as will be appreciated by those of skill in the art.

Referring to FIGS. 1A and 1B, an exemplary colorant 10 is obtained by mixing first 11 and second 12 pigments $P_1$ and $P_2$ in a vial 19. The first 11 and second 12 pigments $P_1$ and $P_2$ have chroma parameters $C^*_1$ and $C^*_2$, respectively. Each of $C^*_1$ and $C^*_2$ is at least 10 units in L*a*b* color space under illumination by a D65 standard light source using the 10 degree observer function. Although other chroma definitions can be used, the above definition has been selected for certainty of the chroma definition. The chroma parameters $C^*_1$ and $C^*_2$ of at least 15 units are preferable, because they result in brighter pigments. More preferably, the parameters $C^*_1$ and $C^*_2$ are at least 25 units.

According to the invention, the first 11 and second 12 pigments being mixed together are of a same or similar color. Quantitatively, this can be expressed via a color difference Δhue between the first and second pigments, which is no more than 30 hue degrees, preferably no more than 20 hue degrees and more preferably no more than 15 hue degrees in the polar projection of the aforementioned L*a*b* color space using the same observer function.

The corrosion resistivity of the pigments 11 and 12 can be represented by a color change exhibited when the pigments 11 and 12 are immersed into a standardized corrosive medium, including alkaline or acidic solutions, a bleach solution, or water. It is assumed that the first pigment 11 undergoes a corrosion-induced color change $\Delta E^*(P_1)$ when immersed into a corrosive solution, and the second pigment 12 undergoes a corrosion-induced color change $\Delta E^*(P_2)$ when immersed into the corrosive solution.

Turning to FIG. 2, the corrosion-induced color change $\Delta E^*(P_2)$ of the second pigment 12, shown with a bottom solid line 22, is less than the corrosion-induced color change $\Delta E^*(P_1)$ of the first pigment 11, shown with a top solid line 21. The colorant 10 is a mixture of the pigments 11 ($P_1$) and 12 ($P_2$). Since $\Delta E^*(P_2) < \Delta E^*(P_1)$, a corrosion-induced color change $\Delta E^*(P_1+P_2)$ upon immersing the colorant 10 into the corrosive solution will generally be less than $\Delta E^*(P_1)$, which is the largest $\Delta E^*$ of the two pigments 11 and 12. The corrosion-induced color change $\Delta E^*(P_1+P_2)$ of the colorant 10 is shown in FIG. 2 with a dashed line 20 disposed between the solid lines 21 and 22. The rationale to mix the less stable first pigment 11 into the more stable pigment 12 is to meet particular color brightness or vividness characteristics. For example, when chroma $C^*_1$ of the first pigment 11 is higher than the chroma $C^*_2$ of the second pigment 12, the chroma $C^*$ of the mixture colorant 10 will be generally higher than the chroma $C^*_2$ of the second pigment 12.

The corrosive solution can include 2% by weight aqueous solution of $H_2SO_4$, 2% by weight aqueous solution of NaOH, a 1.2% by weight aqueous solution of sodium hypochlorite bleach, or distilled water. The corrosion-induced color change $\Delta E^*$ is calculated using the formula $$\Delta E^* = \sqrt{(\Delta L^*)^2 + (\Delta a^*)^2 + (\Delta b^*)^2} \quad (1)$$

wherein $\Delta L^*$ is the lightness change, and $\Delta a^*$ and $\Delta b^*$ are color coordinate changes in the L*a*b* color space, caused by corrosion.

In a preferred embodiment of the invention, the first 11 and second 12 pigments include color-shifting pigments, which are formed from a multilayer thin film structure broken down into small flakes. The multilayer film structure includes an absorber layer or layers, a dielectric layer or layers, and optionally a reflector layer, in varying layer orders. The coatings can be formed to have a symmetrical multilayer thin film structure, such as absorber/dielectric/ reflector/dielectric/absorber; or absorber/dielectric/absorber. Coatings can also be formed to have an asymmetrical multilayer thin film structure, such as absorber/dielectric/ reflector. Color-shifting multilayer interference pigments are particularly advantageous in this invention, because for these pigments, the color can be decoupled from the material system used, allowing one to vary the materials of the dielectric, semi-transparent, and reflective layers to fulfill certain corrosion resistance criteria, while varying thicknesses of these materials to match to each other colors of individual pigments.

By way of a non-limiting illustrative example shown in FIG. 3 with further reference to FIGS. 1A and 1B, the first pigment 11 can include a plurality of color-shifting interference flakes 30 (FIG. 3) including in sequence a top semi-transparent chromium (Cr) layer 31, a top dielectric magnesium fluoride ($MgF_2$) layer 32, a reflective opaque aluminum (Al) layer 33, a bottom dielectric magnesium fluoride ($MgF_2$) layer 34, and a bottom semi-transparent chromium (Cr) layer 35. Of course, the terms "top" and "bottom" are relative, since the flakes 30 can have any orientation when suspended within the first pigment 11. The thicknesses of the first and second chromium 31, 35 and $MgF_2$ layers 32, 24 are selected to make the pigment 11 have blue-greenish color. The second pigment 12 includes the same basic structure of the flakes 30, only the dielectric layers 32, 34 are made of silicon dioxide ($SiO_2$), and the center reflector layer 33 includes chromium which is effectively opaque. The first 11 and second 12 pigments of this composition have chroma of at least 10 units in L*a*b* color space under illumination by a D65 standard light source using the 10 degree observer function, as measured using a standard d/8° integrating sphere geometry. The color difference Δhue between the first 11 and second 12 pigments is no more than 30 hue degrees in the polar projection of the L*a*b* color space at the above illumination/observation conditions.

Table 1 below shows results of testing of color degradation of the first 11 and second 12 pigments upon immersion into 2% by weight aqueous solution of NaOH. The values of C* were measured before the immersion. $\Delta hue_{11-12}$ is a difference of hue between the pigments 11 and 12.

TABLE 1

| Sample Pigment | $\Delta E^*_B$ | C* | $\Delta hue_{11-12}$ |
|---|---|---|---|
| Pigment 11: green-to-blue Cr/MgF$_2$/Al/MgF$_2$/Cr | 27.04 | 60.70 | |
| Pigment 12: green-to-blue Cr/SiO$_2$/Cr/SiO$_2$/Cr | 4.05 | 52.30 | |
| 50:50 mixture of Pigments 11 and 12 | 12.47 | 56.05 | 6.06° |

Figure 4:
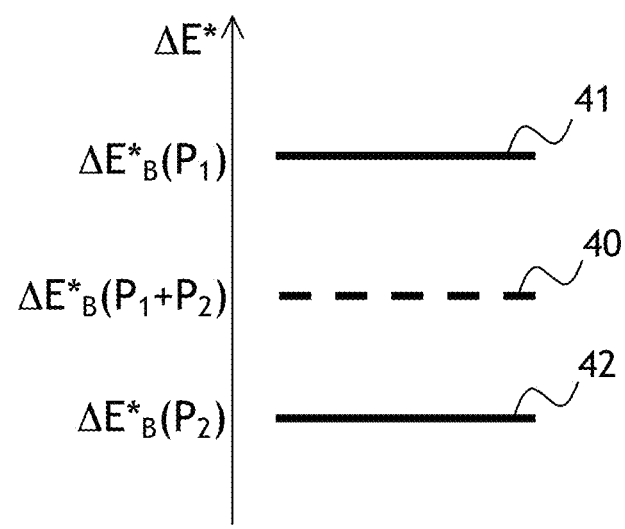
FIG. 4 is a diagram of a base-induced color change of the two color-shifting interference pigments of FIG. 1A and the mixture of these pigments shown in FIG. 1B.

Referring to FIG. 4, the case represented by Table 1 above is illustrated in a ΔE* diagram similar to that of FIG. 2. The base-induced color change of the first pigment 11 $\Delta E^*_B(P_1)$ is shown with a top solid line 41, and the base-induced color change of the second pigment 12 $\Delta E^*_B(P_2)$ is shown with a bottom solid line 42. The base-induced color change $\Delta E^*_B(P_1+P_2)$ upon immersing the colorant 10 into the 2% by weight aqueous solution of NaOH is less than $\Delta E^*_B(P_1)$. In fact, in the example given in Table 1 for 50:50 mixture it is less than one half of $\Delta E^*_B(P_1)$. The base-induced color change $\Delta E^*_B(P_1+P_2)$ of the colorant 10 is shown in FIG. 4 with a dashed line 40 disposed between the solid lines 41 and 42, closer to the bottom line 42.

Figure 5:
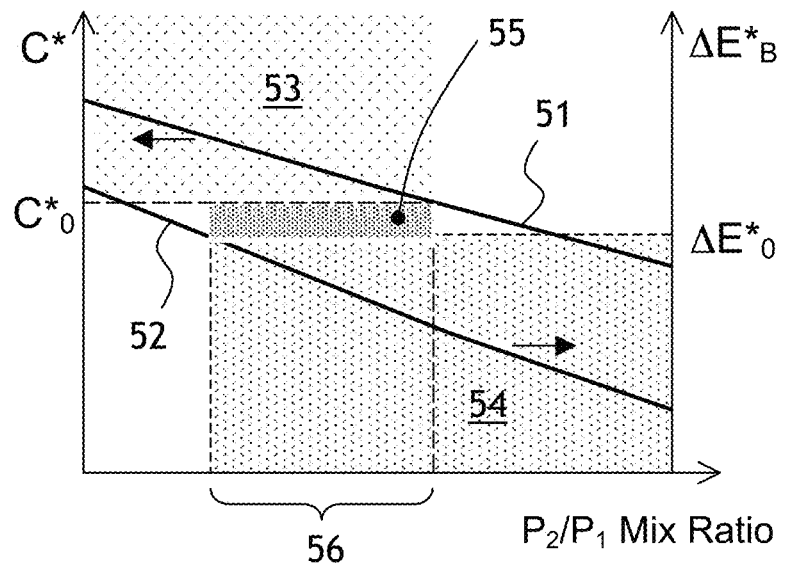
FIG. 5 is a process window diagram for mixing the first and second pigments of FIG. 1A to obtain a colorant of FIG. 1B having an improved alkali resistance, such as the one illustrated by the color change diagram of FIG. 4.

Mixing together the color-shifting interference pigments 11 and 12 of Table 1 at different ratios allows one to optimize the color brightness (chroma) performance of the resulting colorant 10, as well as bring the base-induced color change $\Delta E^*_B(P_1+P_2)$ of the colorant 10 below a pre-defined level. Referring to FIG. 5, chroma C* and the base-induced color change $\Delta E^*_B$ of the colorant 10 are plotted as a function of $P_2/P_1$ mixing ratio. A top solid line 51 represents chroma $C^*(P_2/P_1)$ dependence, and a bottom solid line 52 represents the base-induced color change $\Delta E^*_B(P_1+P_2)$. In this example, the mixing ratio $P_2/P_1$ is selected to simultaneously fulfill two criteria: to have the chroma C* above a threshold value $C^*_0$, and to have the base-induced color change $\Delta E^*_B$ below a threshold value $\Delta E^*_0$.

The chroma line 51 shows that as the ratio $P_2/P_1$ increases, the chroma C* decreases. This is because the chromium reflective layer 33 of the chips 30 of the second pigment 12 is not as reflective as the corresponding aluminum reflective layer 33 of the first pigment 11. A shaded area 53 above the threshold chroma value $C^*_0$ denotes a range of acceptable mixing ratios $P_2/P_1$, at which chroma $C^*>C^*_0$.

The color change line 52 shows that as the mixing ratio $P_2/P_1$ increases, the color change $\Delta E^*_B$ also decreases. This is because the chromium reflective layer 33 of the chips 30 of the second pigment 12 is more stable in basic (alkali) solutions than the corresponding aluminum reflective layer of the first pigment 11. A shaded area 54 below the threshold color change value $\Delta E^*_0$ denotes a range of acceptable mixing ratios $P_2/P_1$, at which chroma $\Delta E^*_B<\Delta E^*_0$.

Together, the shaded areas 53 and 54 define a process window 55 having a range 56 of acceptable mixing ratios $P_2/P_1$, which satisfy the conditions $C^*>C^*_0$ and $\Delta E^*_B<\Delta E^*_0$ simultaneously. It has been found that a range of mixing ratios $P_2/P_1$ varying between 25:75 and 75:25 by weight can provide practically useful results.

Figure 6:
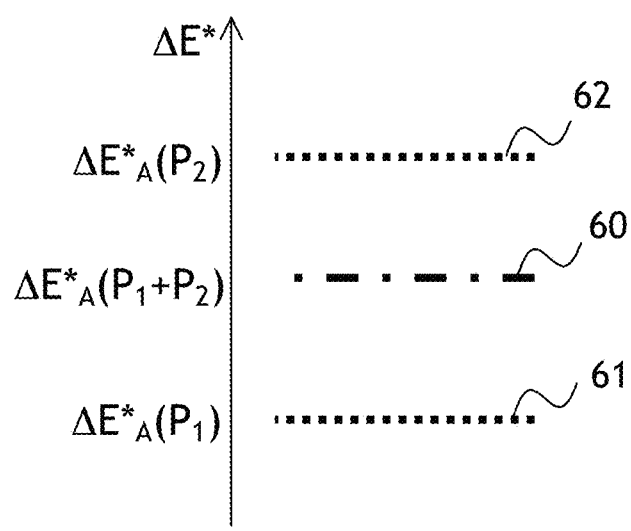
FIG. 6 is a diagram of an acid-induced color change of the two pigments of FIG. 1A and the colorant of FIG. 1B.

Turning to FIG. 6, acid-induced color change of the first pigment 11 $\Delta E^*_A(P_1)$ is shown with a bottom dotted line 61, and the acid-induced color change of the second pigment 12 $\Delta E^*_A(P_2)$ is shown with a top dotted line 62. The acid-induced color change $\Delta E^*_A(P_1+P_2)$ upon immersing the colorant 10 into the 2% by weight aqueous solution of $H_2SO_4$ is less than $\Delta E^*_A(P_2)$. The acid-induced color change $\Delta E^*_A(P_1+P_2)$ is shown with a dotted-dashed line 60. In a preferred embodiment of the invention, the two pigments 11 and 12 are selected so that while the first pigment 11 corrodes more in basic solutions than in acidic solutions, that is, $\Delta E^*_B(P_1)>\Delta E^*_A(P_1)$, the second pigment 12 corrodes more in acidic solutions than in basic solutions, that is, $\Delta E^*_A(P_2)>\Delta E^*_B(P_2)$.

Figure 7:
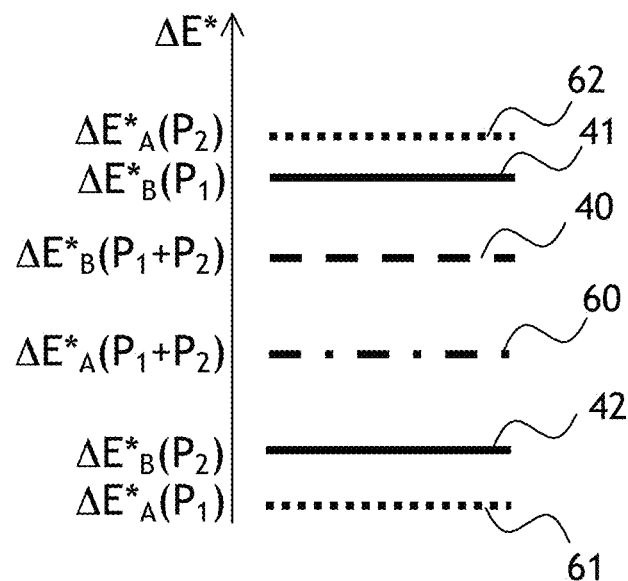
FIG. 7 is a combination of the diagrams of FIGS. 4 and 6.

Referring to FIG. 7, the $\Delta E^*_B(P_1)>\Delta E^*_A(P_1)$ and $\Delta E^*_A(P_2)>\Delta E^*_B(P_2)$ conditions are illustrated by means of a corrosion-induced color change diagram. FIG. 7 is a combination of FIG. 4 showing the condition $\Delta E^*_B(P_1)>\Delta E^*_A(P_1)$, and FIG. 6 showing the condition $\Delta E^*_A(P_2)>\Delta E^*_B(P_2)$. Table 2 below includes results of corrosion-induced color degradation $\Delta E^*$ testing for the material systems of the first 11 and second 12 pigments satisfying the $\Delta E^*$ relationships represented by FIG. 7. In Table 2 below, the first 11 and second 12 pigments are color-shifting interference pigments including pigment flakes similar to the flake 30 shown in FIG. 3. The first pigment 11 includes the semi-transparent chromium (Cr) layers 31 and 35, the dielectric magnesium fluoride ($MgF_2$) layers 32 and 34, and the reflective aluminum (Al) layer 33. The second pigment 12 includes the semi-transparent bismuth (Bi) layers 31 and 35, the dielectric magnesium fluoride ($MgF_2$) layers 32 and 34, and the reflective ferrochrome (FeCr) layer 33. The first 11 and second 12 pigments of this composition have chroma of at least 10 units in L*a*b* color space under illumination by a D65 standard light source using the 10 degrees observer function, as measured using a d/8° integrating sphere geometry. The color difference $\Delta E^*$ between the first 11 and second 12 pigments is no more than 30 hue degrees in the polar projection of the L*a*b* color space at the above illumination/observation conditions. The values of C* were measured before the immersion. $\Delta hue_{11-12}$ is a difference of hue between the pigments 11 and 12.

TABLE 2

| Sample Pigment | $\Delta E^*_B$ | $\Delta E^*_A$ | C* | $\Delta hue_{11-12}$ |
|---|---|---|---|---|
| Pigment 11: Cr/MgF$_2$/Al/MgF$_2$/Cr | 27.04 | 1.79 | 60.70 | |
| Pigment 12: Bi/MgF$_2$/FeCr/MgF$_2$/Bi | 4.71 | 30.12 | 37.25 | |
| 50:50 mixture of Pigments 11 and 12 | 20.94 | 12.47 | 51.76 | 18.15° |

By comparing the values of $\Delta E^*$ for the first 11 and second 12 pigments, one can see that the first pigment 11 exhibits a higher color change $\Delta E^*_B$ in the basic solution, the second pigment 12 exhibits a higher color change $\Delta E^*_A$ in the acidic solution, and the 50:50 mixture 10 of the pigments 11 and 12 exhibits a smaller color change $\Delta E^*_B$ in the basic solution than the first pigment 11 (albeit bigger than the second pigment 12), and a smaller color change $\Delta^*E_A$ in the acidic solution than the second pigment 12 (albeit bigger than the first pigment 11). Therefore, the 50:50 mixture 10 of the pigments 11 and 12 can meet a corrosion resistance specification specifying both a minimal acid corrosion resistance and a minimal alkali corrosion resistance, while the pigments 11 and 12 by themselves do not.

Table 3 below illustrates corrosion performance of another material system. In Table 3, the first pigment 11 is the same as in Table 2. The second pigment 12 includes the semi-transparent iron (Fe) layers 31 and 35, the dielectric magnesium fluoride ($MgF_2$) layers 32 and 34, and the reflective ferrochrome (FeCr) layer 33. The first 11 and second 12 pigments of this composition have chroma of at least 10 units in L*a*b* color space under illumination by a D65 standard light source using the 10 degrees observer function, as measured using a d/8° integrating sphere geometry. The color difference between the first 11 and second 12 pigments is no more than 30 hue degrees in the polar projection of the L*a*b* color space at the above illumination/observation conditions.

TABLE 3

| Sample Pigment | $\Delta E^*_B$ | $\Delta E^*_A$ | C* | $\Delta hue_{11-12}$ |
|---|---|---|---|---|
| Pigment 11: Cr/MgF$_2$/Al/MgF$_2$/Cr | 27.04 | 1.79 | 60.70 | |
| Pigment 12: Fe/MgF$_2$/FeCr/MgF$_2$/Fe | 0.99 | 37.30 | 37.54 | |
| 50:50 mixture of Pigments 11 and 12 | 14.30 | 7.35 | 49.53 | 27.12° |

Figure 8:
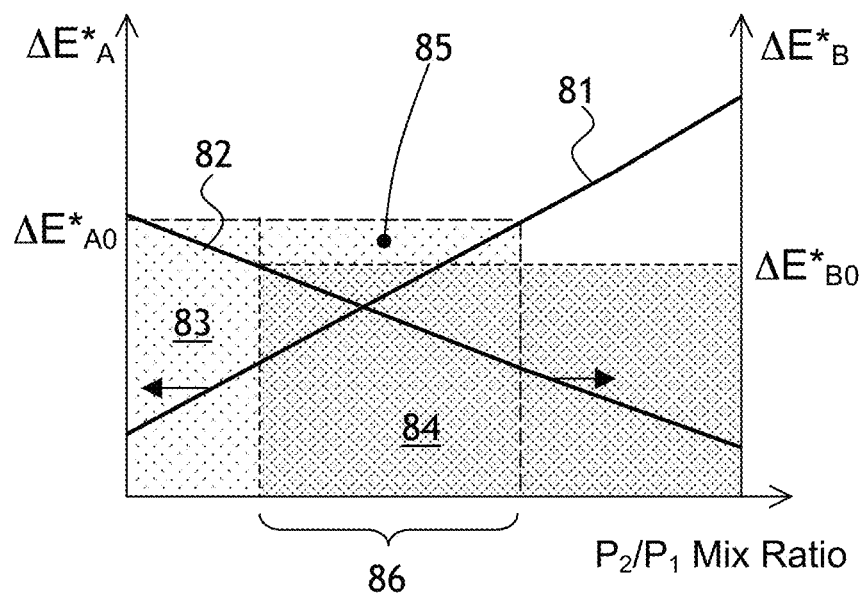
FIG. 8 is a process window diagram for mixing the first and second pigments of FIG. 1A to obtain a colorant having improved alkali and acidic resistance, such as the one illustrated by the color change diagram of FIG. 7.

Mixing together the color-shifting interference pigments 11 and 12 at different ratios allows one to bring the required acid—and the base-induced color change $\Delta E^*_A(P_1+P_2)$ and $\Delta E^*_B(P_1+P_2)$, respectively, of the colorant 10 down to acceptable levels. Referring to FIG. 8, the acid—and the base-induced color change $\Delta E^*_A(P_1+P_2)$ and $\Delta E^*_B(P_1+P_2)$, respectively, of the colorant 10 of Table 2 are plotted as a function of $P_2/P_1$ mixing ratio. A positive-slope solid line 81 represents the acid-induced color change $\Delta E^*_A(P_2/P_1)$ dependence, and a negative-slope solid line 82 represents the base-induced color change $\Delta E^*_B(P_1+P_2)$. In this example, the mixing ratio $P_2/P_1$ is selected to simultaneously fulfill two criteria: to have the acid-induced color change $\Delta E^*_A$ below a threshold value $\Delta E^*_{A0}$, and to have the base-induced color change $\Delta E^*_B$ below a threshold value $\Delta E^*_{B0}$.

The positive-slope solid line 81 shows that as the ratio $P_2/P_1$ increases, the acid-induced color change $\Delta E^*_A(P_2/P_1)$ of the mixture colorant 10 increases. This is because bismuth (Bi) is more sensitive to acids than to bases. A shaded area 83 below the threshold value $\Delta E^*_{A0}$ denotes a range of acceptable mixing ratios $P_2/P_1$, at which chroma $\Delta E^*_A(P_2/P_1)<\Delta E^*_{A0}$.

The negative-slope solid line 82 shows that as the ratio $P_2/P_1$ increases, the base-induced color change $\Delta E^*_B(P_2/P_1)$ of the mixture colorant 10 decreases. This is because aluminum (Al) is more sensitive to bases than to acids. A shaded area 84 below the threshold value $\Delta E^*_{B0}$ denotes a range of acceptable mixing ratios $P_2/P_1$, at which chroma $\Delta E^*_B(P_2/P_1)<\Delta E^*_{B0}$.

Together, the shaded areas 83 and 84 define a process window 85 having a range 86 of acceptable mixing ratios $P_2/P_1$, which satisfy the conditions $\Delta E^*_A(P_2/P_1)<\Delta E^*_{A0}$ and $\Delta E^*_B(P_2/P_1)<\Delta E^*_{B0}$ simultaneously.

In accordance with a further embodiment of the invention, three or more pigments can be mixed together. For example, a third pigment $P_3$ having the semi-transparent chromium (Cr) layers 31 and 35, the dielectric silicon dioxide ($SiO_2$) layers 32 and 34, and the reflective chromium (Al) layer 33, can be added to the first 11 and second 12 pigments of Table 3 above. The third pigment $P_3$ based only on chromium and silicon dioxide is quite stable in both acidic and alkaline solutions, but has a relatively low chroma. Accordingly, if the chroma specification permits, the third pigment $P_3$ added to the first and second pigments of Table 3, can further increase the corrosion resistance of the colorant 10, albeit at a slight drop of chroma $C^*$ of the colorant 10. To improve the corrosion resistance of the colorant 10, the corrosion-induced color change $\Delta E^*(P_3)$ of the third pigment $P_3$ upon immersion into the corrosive solution should satisfy the condition $\Delta E^*(P_3)<\Delta E^*(P_2)$. The chroma $C^*_3$ of the third pigment $P_3$ should be at least 10 units in $L^*a^*b^*$ color space under illumination by a D65 standard light source using a 10 degree observer function, and a color difference between the first $P_1$, second $P_2$, and third $P_3$ pigments is no more than 30 hue degrees in a polar projection of the $L^*a^*b^*$ color space. The three-component colorants 10 can include at least 25% of individual pigments $P_1$, $P_2$, and $P_3$ by weight.

A method of manufacture of the colorant 10 of the invention includes a first step of providing the first 11 ($P_1$) and second 12 ($P_2$) pigments, and a second step of mixing the pigments 11 and 12 together to obtain the colorant 10. The pigments 11 and 12 each have chroma $C^*_1$ and $C^*_2$, respectively, of at least 10 units in $L^*a^*b^*$ color space as explained above. The first pigment 11 undergoes a corrosion-induced color change $\Delta E^*(P_1)$ upon immersion into a corrosive solution, and the second pigment 12 undergoes a corrosion-induced color change $\Delta E^*(P_2)$ upon immersion into the corrosive solution, wherein $\Delta E^*(P_2)<\Delta E^*(P_1)$. Upon mixing, the colorant 10 has $\Delta E^*(P_1+P_2)<\Delta E^*(P_1)$ as explained above. The proportion of the first 11 and second 12 pigments in the colorant 10 is preferably between 25:75 and 75:25.

The corrosion-induced color changes of the first 11 and second 12 pigments and the colorant 10 include base-induced color changes $\Delta E^*_B(P_1)$, $\Delta E^*_B(P_2)$, and $\Delta E^*_B(P_1+P_2)$, respectively, upon immersion into the 2% by weight aqueous solution of NaOH; and $\Delta E^*_A(P_1)$, $\Delta E^*_A(P_2)$, and $\Delta E^*_A(P_1+P_2)$, respectively, upon immersion into the 2% by weight aqueous solution of $H_2SO_4$. In one embodiment, $\Delta E^*_A(P_1)<\Delta E^*_B(P_1)$ and $\Delta E^*_A(P_2)>\Delta E^*_B(P_2)$, while $\Delta E^*_A(P_2)>\Delta E^*_A(P_1)$. This interrelationship between acidic and alkali induced color changes $\Delta E^*$ of the ingredients result in acid-induced color change $\Delta E^*_A(P_1+P_2)$ of the colorant 10 upon immersion into the 2% by weight aqueous solution of $H_2SO_4$ satisfying the condition $\Delta E^*_A(P_1+P_2)<\Delta E^*_A(P_2)$, that is, the acidic resistance of the mixture colorant 10 improves as compared to that of the second pigment 12; and the alkali resistance of the mixture colorant 10 improves in comparison with that of the first pigment 11. The proportion of the first 11 and second 12 pigments in the colorant 10 is preferably between 25:75 and 75:25.

As noted above, the first 11 and second 12 pigments preferably include color-shifting interference pigments. For certainty, the conditions of chroma $C^*_1$ and $C^*_2$ of at least 10 units in $L^*a^*b^*$ color space under illumination by a D65 standard light source using the 10 degree observer function, and the color difference between the first 11 and second 12 pigments of no more than 30 hue degrees in the polar projection of the $L^*a^*b^*$ color space color space is fulfilled as measured using a d/8° integrating sphere geometry.

The chips or flakes 30 of the color-shifting interference pigments 11 and 12 can include, by means of example and without limitation, chromium (Cr), bismuth (Bi), iron (Fe), and ferrochrome (FeCr) outer semi-transparent layers 31 and 35, for providing different acid and/or alkali resistance. It is preferable that the first pigment 11 includes chromium (Cr) in the outer semi-transparent layers 31 and 35, and the second pigment 12 includes bismuth (Bi) or iron (Fe) in the outer semi-transparent layers 31 and 35. The reflective metal 33 can include aluminum (Al), chromium (Cr), ferrochrome (FeCr), and other materials.

The dielectric layers of the flakes 30 of the color-shifting interferometric pigments 11 and 12 can include layers having a "high" index of refraction, defined herein as greater than about 1.8 or 1.9, as well as those have a "low" index of refraction, which is defined herein as about 1.65 or less. Each of the dielectric layers 32, 34 (FIG. 3) can be formed of a single material or with a variety of material combinations and configurations. For example, the dielectric layers 32, 34 can be formed of only a low index material or only a high index material, a mixture or multiple sub-layers of two or more low index materials, a mixture or multiple sub-layers of two or more high index materials, or a mixture or multiple sub-layers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for the dielectric layers 32, 34 include zinc sulfide (ZnS), zinc oxide (ZnO), zirconium oxide ($ZrO_2$), titanium dioxide ($TiO_2$) diamond-like carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide (HfO2), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Examples of suitable low refractive index materials for the dielectric layers 32, 34 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. For instance, the invention is not limited to color-shifting interference pigments. Other pigments such as interference pigments, lamellar pigments, mica pigments, metallic flake pigments, and organic pigments exhibiting different alkali and/or acidic and/or bleach and/or water resistance can be used as well.

What is claimed is:

1. A colorant comprising:
a mixture of a first pigment $P_1$ and a second pigment $P_2$ having chroma $C^*_1$ and $C^*_2$, respectively, wherein each of $C^*_1$ and $C^*_2$ is at least 10 units in $L^*a^*b^*$ color space under illumination by a D65 standard light source using a 10 degree observer function, wherein a color difference between the first pigment $P_1$ and the second pigment $P_2$ is no more than 30 hue degrees in a polar projection of the $L^*a^*b^*$ color space,
wherein the first pigment $P_1$ undergoes a corrosion-induced color change $\Delta E^*(P_1)$ when immersed into a corrosive solution, and wherein the second pigment $P_2$ undergoes a corrosion-induced color change $\Delta E^*(P_2)$ when immersed into the corrosive solution, wherein $\Delta E^*(P_2) < \Delta E^*(P_1)$,
wherein a corrosion-induced color change $\Delta E^*(P_1+P_2)$ of the colorant upon immersion into the corrosive solution satisfies a condition $\Delta E^*(P_1+P_2) < \Delta E^*(P_1)$,
wherein the corrosive solution is selected from the group consisting of 2% by weight aqueous solution of $H_2SO_4$, 2% by weight aqueous solution of NaOH, 1.2% by weight aqueous solution of sodium hypochlorite, and water,
wherein the second pigment $P_2$ includes a plurality of layers,
wherein the plurality of layers include a layer between at least two other layers of the plurality of layers, and
wherein the layer includes FeCr.

2. The colorant of claim 1, wherein the first pigment $P_1$ and the second pigment $P_2$ comprise first and second color-shifting interference pigments, respectively, wherein each of $C^*_1$ and $C^*_2$ and the color difference between the first pigment $P_1$ and the second pigment $P_2$ are measured using a d/8° integrating sphere geometry.

3. The colorant of claim 2, wherein corrosion-induced color changes of the first pigment $P_1$ and the second pigment $P_2$ and the colorant comprise base-induced color changes $\Delta E^*_B(P_1)$, $\Delta E^*_B(P_2)$, and $\Delta E^*_B(P_1+P_2)$, respectively, upon immersion into the 2% by weight aqueous solution of NaOH.

4. The colorant of claim 3, wherein
the first pigment $P_1$ undergoes an acid-induced color change $\Delta E^*_A(P_1)$ upon immersion into the 2% by weight aqueous solution of $H_2SO_4$, wherein $\Delta E^*_A(P_1) < \Delta E^*_B(P_1)$, and
the second pigment $P_2$ undergoes an acid-induced color change $\Delta E^*_A(P_2)$ upon immersion into the 2% by weight aqueous solution of $H_2SO_4$, wherein $\Delta E^*_A(P_2) > \Delta E^*_B(P_2)$, wherein $\Delta E^*_A(P_2) > \Delta E^*_A(P_1)$, whereby an acid-induced color change $\Delta E^*_A(P_1+P_2)$ of the colorant upon immersion into the 2% by weight aqueous solution of $H_2SO_4$ satisfies a condition $\Delta E^*_A(P_1+P_2) < \Delta E^*_A(P_2)$.

5. The colorant of claim 2, wherein $C^*_1 > C^*_2$, whereby chroma of the colorant $C^*_c$ satisfies a condition $C^*_c > C^*_2$.

6. The colorant of claim 5, wherein $C^*_1$ and $C^*_2$ are each at least 15 units in the $L^*a^*b^*$ color space.

7. The colorant of claim 6, wherein $C^*_1$ and $C^*_2$ are each at least 25 units in the $L^*a^*b^*$ color space.

8. The colorant of claim 1, wherein a proportion of the first pigment $P_1$ and the second pigment $P_2$ in the colorant is between 25:75 and 75:25 by weight.

9. The colorant of claim 2, wherein $\Delta E^*(P_1+P_2) < \frac{1}{2}\Delta E^*(P_1)$.

10. The colorant of claim 2, wherein the color difference between the first pigment $P_1$ and the second pigment $P_2$ is no more than 20 hue degrees in the polar projection of the $L^*a^*b^*$ color space.

11. The colorant of claim 2, wherein the first and second color-shifting interference pigments each comprise a plurality of color-shifting interference flakes having at least five layers including a metal layer, wherein the color-shifting interference flakes of the first color-shifting interference pigment comprise chromium in their outer layers, and the color-shifting interference flakes of the second color-shifting interference pigment comprise bismuth or iron in their outer layers.

12. The colorant of claim 2, further comprising:
a third pigment $P_3$ having chroma $C^*_3$ of at least 10 units in the $L^*a^*b^*$ color space under illumination by the D65 standard light source using the 10 degree observer function, wherein a color difference between the first pigment $P_1$, the second pigment $P_2$, and the third pigment $P_3$ is no more than 30 hue degrees in a polar projection of the $L^*a^*b^*$ color space,
wherein the third pigment $P_3$ undergoes a corrosion-induced color change $\Delta E^*(P_3)$ when immersed into the corrosive solution, wherein $\Delta E^*(P3) < \Delta E^*(P_2)$.

13. A method of manufacture of a colorant, the method comprising:
(a) providing a first pigment $P_1$ and second pigment $P_2$ each having chroma $C^*_1$ and $C^*_2$, respectively, wherein each of $C^*_1$ and $C^*_2$ is at least 10 units in $L^*a^*b^*$ color space under illumination by a D65 standard light source using a 10 degree observer function, wherein a color difference between the first pigment $P_1$ and the second pigment $P_2$ is no more than 30 hue degrees in a polar projection of the $L^*a^*b^*$ color space,
wherein the first pigment $P_1$ undergoes a corrosion-induced color change $\Delta E^*(P_1)$ upon immersion into a corrosive solution, and wherein the second pigment $P_2$ undergoes a corrosion-induced color change $\Delta E^*(P_2)$ upon immersion into the corrosive solution, wherein $\Delta E^*(P_2) < \Delta E^*(P_1)$; and (b) mixing together the first pigment $P_1$ and the second pigment $P_2$ to obtain the colorant having a corrosion-induced color change $\Delta E^*(P_1+P_2)$ upon immersion into the corrosive solution satisfying a condition $\Delta E^*(P_1+P_2)<\Delta E^*(P_1)$, wherein the corrosive solution is selected from the group consisting of 2% by weight aqueous solution of $H_2SO_4$, 2% by weight aqueous solution of NaOH, 1.2% by weight aqueous solution of sodium hypochlorite bleach, and water, and wherein the second pigment $P_2$ includes a plurality of layers, wherein the plurality of layers include a layer between at least two other layers of the plurality of layers, and wherein the layer includes FeCr.

14. The method of claim 13, wherein in step (a), the first pigment $P_1$ and second pigment $P_2$ comprise first and second color-shifting interference pigments, respectively, wherein each of $C^*_1$ and $C^*_2$ and the color difference between the first pigment $P_1$ and the second pigment $P_2$ are measured using a d/8° integrating sphere geometry.

15. The method of claim 14, wherein
in step (a),
corrosion-induced color changes of the first pigment $P_1$ and the second pigment $P_2$ and the colorant comprise base-induced color changes $\Delta E^*_B(P_1)$, $\Delta E^*_B(P_2)$, and $\Delta E^*_B(P_1+P_2)$, respectively, upon immersion into the 2% by weight aqueous solution of NaOH;

the first pigment $P_1$ undergoes an acid-induced color change $\Delta E^*_A(P_1)$ upon immersion into the 2% by weight aqueous solution of $H_2SO_4$, wherein $\Delta E^*_A(P_1)<\Delta E^*_B(P_1)$; and the second pigment $P_2$ undergoes an acid-induced color change $\Delta E^*_A(P_2)$ upon immersion into the 2% by weight aqueous solution of $H_2SO_4$, wherein $\Delta E^*_A(P_2)>\Delta E^*_B(P_2)$, and $\Delta E^*_A(P_2)>\Delta E^*_A(P_1)$, whereby an acid-induced color change $\Delta E^*_A(P_1+P_2)$ of the colorant upon immersion into the 2% by weight aqueous solution of $H_2SO_4$ satisfies a condition $\Delta E^*_A(P_1+P_2)<\Delta E^*_A(P_2)$.

16. The method of claim 15, wherein in step (a), the first color-shifting interference pigment comprises a plurality of multi-layer color-shifting interference flakes having chromium in outer layers thereof, and the second color-shifting interference pigment comprises a plurality of multi-layer color-shifting interference flakes having bismuth or iron in outer layers thereof.

17. The method of claim 14, wherein
step (b) includes mixing in a third pigment $P_3$ having chroma $C^*_3$ of at least 10 units in the L*a*b* color space under illumination by the D65 standard light source using a 10 degree observer function, a color difference between the first pigment $P_1$, the second pigment $P_2$, and the third pigment $P_3$ is no more than 30 hue degrees in a polar projection of the L*a*b* color space, and the third pigment $P_3$ undergoes a corrosion-induced color change $\Delta E^*(P_3)$ when immersed into the corrosive solution, wherein $\Delta E^*(P_3)<\Delta E^*(P_2)$.

18. A colorant comprising a mixture of a first pigment $P_1$ and a second pigment $P_2$,
wherein the first pigment $P_1$ is $Cr/MgF_2/Al/MgF_2/Cr$,
wherein the second pigment $P_2$ includes a plurality of layers,
wherein the plurality of layers include a layer between at least two other layers of the plurality of layers, and
wherein the layer includes FeCr.

19. A colorant comprising a mixture of a first pigment $P_1$ and a second pigment $P_2$ wherein $P_1$ is $Cr/MgF_2/Al/MgF_2/Cr$ and $P_2$ is $Bi/MgF_2/FeCr/MgF_2/Bi$.

20. A colorant comprising a mixture of a first pigment $P_1$ and a second pigment $P_2$ wherein $P_1$ is $Cr/MgF_2/Al/MgF_2/Cr$ and $P_2$ is $Fe/MgF_2/FeCr/MgF_2/Fe$.

* * * * *